United States Patent
Friesinger et al.

(10) Patent No.: US 9,997,885 B2
(45) Date of Patent: Jun. 12, 2018

(54) METHOD AND DEVICE FOR PRODUCING A CABLE AND CABLE PRODUCED BY THE METHOD

(71) Applicant: MD ELEKTRONIK GmbH, Waldkraiburg (DE)

(72) Inventors: Johann Friesinger, Rechtmehring (DE); Markus Lindner, Waldkraiburg (DE)

(73) Assignee: MD ELEKTRONIK GmbH, Waldkraiburg (DE)

( * ) Notice: Subject to any disclaimer, the term of this patent is extended or adjusted under 35 U.S.C. 154(b) by 35 days.

(21) Appl. No.: 15/041,280

(22) Filed: Feb. 11, 2016

(65) Prior Publication Data

US 2016/0233637 A1    Aug. 11, 2016

(30) Foreign Application Priority Data

Feb. 11, 2015   (EP) ..................... 15154587

(51) Int. Cl.
| | |
|---|---|
| *H01R 43/048* | (2006.01) |
| *H01R 4/20* | (2006.01) |
| *H01R 43/05* | (2006.01) |
| *H01R 43/058* | (2006.01) |
| *H01R 4/18* | (2006.01) |
| *H02G 1/12* | (2006.01) |

(52) U.S. Cl.
CPC ............ *H01R 43/048* (2013.01); *H01R 4/18* (2013.01); *H01R 4/20* (2013.01); *H01R 43/05* (2013.01); *H01R 43/058* (2013.01); *H01R 2201/26* (2013.01); *H02G 1/1253* (2013.01)

(58) Field of Classification Search
CPC .... H01R 43/048; H01R 43/05; H01R 43/052; H01R 43/055; H01R 43/058; H01R 4/20; H01R 4/18; H01R 2201/26; H02G 1/1253
USPC ............ 72/407–409.19, 84, 409.06, 409.14; 29/857, 863, 861, 862, 867
See application file for complete search history.

(56) References Cited

U.S. PATENT DOCUMENTS

| | | | | |
|---|---|---|---|---|
| 2,034,090 A | * | 3/1936 | Douglas ................... | H01R 4/20 29/453 |
| 2,226,849 A | * | 12/1940 | Douglas ................... | H01R 4/20 29/514 |

(Continued)

FOREIGN PATENT DOCUMENTS

| | | |
|---|---|---|
| DE | 7716155 U1 | 11/1978 |
| JP | 7256464 A | 9/1995 |

(Continued)

*Primary Examiner* — Peter DungBa Vo
*Assistant Examiner* — Kaying Kue
(74) *Attorney, Agent, or Firm* — Leydig, Voit & Mayer, Ltd.

(57) ABSTRACT

A method is for producing a cable which comprises a conductor and a barrel. The conductor has individual wires and is enclosed, at least in portions, by a piece of insulation. The conductor is heated and a crimping process is carried out for electrically contacting the barrel with the conductor. The barrel is pressed together with the heated conductor during the crimping process in such a way that the conductor is initially compressed on a first axial sub-portion of the conductor and subsequently the compression of the conductor is spread to a larger second axial sub-portion.

16 Claims, 5 Drawing Sheets

(56) References Cited

U.S. PATENT DOCUMENTS

| | | | | | |
|---|---|---|---|---|---|
| 2,382,292 | A | * | 8/1945 | Carlson | H01R 43/042 29/866 |
| 2,535,013 | A | * | 12/1950 | Freedom | H01R 4/20 140/113 |
| 2,693,216 | A | * | 11/1954 | Broske | H01R 4/20 29/863 |
| 2,759,161 | A | * | 8/1956 | Berg | H01R 4/026 439/424 |
| 2,816,276 | A | * | 12/1957 | Fuller | H01R 4/20 29/517 |
| 3,067,489 | A | * | 12/1962 | Hoffman | H01R 4/20 29/518 |
| 3,314,135 | A | * | 4/1967 | Smith | B25B 27/146 29/751 |
| 3,523,777 | A | * | 8/1970 | Rohrer | G01N 27/36 204/420 |
| 3,728,889 | A | * | 4/1973 | McIver | H01R 4/20 29/517 |
| 3,736,788 | A | * | 6/1973 | Olive-Jones | B21D 39/04 29/237 |
| 3,769,484 | A | * | 10/1973 | Stut | C30B 13/20 422/250.1 |
| 3,792,603 | A | * | 2/1974 | Orain | B21D 39/04 29/517 |
| 3,940,838 | A | * | 3/1976 | Gryctko | H01R 43/042 29/461 |
| 4,067,105 | A | * | 1/1978 | Zahn | H01R 43/04 29/869 |
| 4,117,711 | A | * | 10/1978 | Medcraft | B23D 23/00 29/560 |
| 4,118,971 | A | * | 10/1978 | Izraeli | H01R 43/058 72/409.16 |
| 4,459,839 | A | * | 7/1984 | Cochran | H01R 43/042 72/31.01 |
| 4,509,255 | A | * | 4/1985 | Costello | H01R 43/16 174/84 C |
| 4,654,478 | A | * | 3/1987 | Ishihara | H01B 17/40 174/176 |
| 4,712,296 | A | * | 12/1987 | Forney, Jr. | H01R 13/41 174/75 C |
| 4,828,516 | A | * | 5/1989 | Shaffer | H01R 43/058 29/863 |
| 4,829,805 | A | * | 5/1989 | Koehn | B25B 27/146 29/751 |
| 4,880,484 | A | * | 11/1989 | Obermeier | G02B 6/4482 156/51 |
| 4,885,928 | A | * | 12/1989 | Davis | B21D 39/048 29/237 |
| 4,910,857 | A | * | 3/1990 | Tanaka | G02B 6/3801 29/515 |
| 4,917,623 | A | * | 4/1990 | Grabbe | H01R 13/28 439/284 |
| 4,920,642 | A | * | 5/1990 | Yanai | H01R 12/592 29/860 |
| 4,921,447 | A | * | 5/1990 | Capp | H01R 43/0207 439/585 |
| 4,926,685 | A | * | 5/1990 | Shannon, Sr. | H01R 43/042 29/751 |
| 5,012,666 | A | * | 5/1991 | Chen | H01R 43/042 29/751 |
| 5,063,770 | A | * | 11/1991 | Chen | H01R 43/0421 140/106 |
| 5,335,530 | A | * | 8/1994 | Homm | B21D 39/04 72/402 |
| 5,412,184 | A | * | 5/1995 | McGaffigan | B29C 65/3668 219/635 |
| 5,562,482 | A | * | 10/1996 | Wright | H01R 9/0512 439/394 |
| 5,595,094 | A | * | 1/1997 | Negus | B25B 7/02 81/3.44 |
| 5,725,387 | A | * | 3/1998 | O'Sullivan | H01R 4/187 439/98 |
| 6,109,088 | A | * | 8/2000 | Schrader | H01R 43/042 29/751 |
| 6,138,346 | A | * | 10/2000 | Shutts | B25B 7/126 29/741 |
| 6,151,950 | A | * | 11/2000 | Wilhelm | B25B 7/10 29/751 |
| 6,161,416 | A | * | 12/2000 | Wilhelm | B25B 27/146 72/409.08 |
| 6,293,005 | B1 | * | 9/2001 | Van Den Berg | H01B 13/30 174/110 R |
| 6,324,884 | B1 | * | 12/2001 | Barjesteh | B21D 39/046 29/237 |
| 6,393,924 | B1 | * | 5/2002 | Eder | B23K 20/10 73/850 |
| 6,442,832 | B1 | * | 9/2002 | Noble | H01R 43/048 174/261 |
| 6,875,966 | B1 | * | 4/2005 | Barber | B23K 3/04 219/616 |
| 6,990,843 | B2 | * | 1/2006 | Frenken | B21D 39/048 29/751 |
| 7,059,166 | B2 | * | 6/2006 | Bowles | B25B 27/10 29/237 |
| 7,290,322 | B2 | * | 11/2007 | Cai | B60G 21/0551 267/140 |
| 7,305,749 | B2 | * | 12/2007 | Kramer | H01R 4/20 29/564.4 |
| 8,241,029 | B2 | * | 8/2012 | Kidd | B21D 39/046 425/318 |
| 8,474,299 | B2 | * | 7/2013 | Lutze | B25B 27/146 72/402 |
| 9,003,645 | B1 | * | 4/2015 | Yost | H01R 43/0421 29/705 |
| 9,520,668 | B2 | * | 12/2016 | Schmidt | H01R 13/422 |
| 2002/0145421 | A1 | * | 10/2002 | Rose | G01B 7/003 324/207.26 |
| 2005/0257592 | A1 | * | 11/2005 | Baker | H01R 43/042 72/409.16 |
| 2008/0196246 | A1 | * | 8/2008 | Tran | H01R 4/20 29/868 |
| 2008/0307934 | A1 | * | 12/2008 | Coe | B25B 7/02 72/409.16 |
| 2008/0311328 | A1 | * | 12/2008 | Kimura | C08K 9/06 428/36.91 |
| 2009/0038149 | A1 | * | 2/2009 | Varkey | H01B 13/016 29/825 |
| 2009/0089998 | A1 | * | 4/2009 | Varkey | H01B 13/24 29/825 |
| 2011/0011149 | A1 | * | 1/2011 | McKinnon | A61M 5/329 72/367.1 |
| 2012/0118633 | A1 | | 5/2012 | Warner | |
| 2012/0260714 | A1 | * | 10/2012 | Hutchfield | H01R 43/042 72/409.1 |
| 2013/0285777 | A1 | * | 10/2013 | Piascik | H01F 5/04 335/299 |
| 2014/0144015 | A1 | * | 5/2014 | Mayer | H01R 4/187 29/860 |
| 2014/0150259 | A1 | * | 6/2014 | Lehmann | H01R 4/203 29/857 |
| 2014/0246220 | A1 | * | 9/2014 | Allais | H01B 3/441 174/110 R |
| 2014/0312097 | A1 | * | 10/2014 | Miyazato | H01R 43/00 228/111 |
| 2014/0317922 | A1 | * | 10/2014 | Schmidt | H01R 13/422 29/863 |
| 2015/0052966 | A1 | * | 2/2015 | Smith | H01R 43/042 72/454 |
| 2016/0203891 | A1 | * | 7/2016 | Mukaiyama | H01B 13/0016 427/430.1 |

FOREIGN PATENT DOCUMENTS

| | | |
|---|---|---|
| JP | 2001196148 A | 7/2001 |
| JP | 2006236724 A | 9/2006 |
| WO | WO 03097289 A1 | 11/2003 |

* cited by examiner

METHOD AND DEVICE FOR PRODUCING A CABLE AND CABLE PRODUCED BY THE METHOD

CROSS-REFERENCE TO PRIOR APPLICATION

Priority is claimed to European Patent Application No. EP 15 154 587.8, filed on Feb. 11, 2015, the entire disclosure of which is hereby incorporated by reference herein.

FIELD

The invention relates to a method for producing a ready-to-use cable, to a device for producing or preparing a cable of this type and to a cable produced by the method or using the device.

The cables of the present application can be used for example in motor vehicles or aircraft and are generally required in large numbers. For cost-effective provision of cables of this type, a simple construction and the possibility of simple preparation are of great importance.

BACKGROUND

WO 03/097289 A1 discloses a method for producing a cable in which an unstripped end of the electrical conductor is brought into connection with a contact partner, the connection region being heated and subsequently pressed together.

SUMMARY

In an embodiment, the present invention provides a method for producing a cable which comprises a conductor and a barrel. The conductor has individual wires and is enclosed, at least in portions, by a piece of insulation. The conductor is heated and a crimping process is carried out for electrically contacting the barrel with the conductor. The barrel is pressed together with the heated conductor during the crimping process in such a way that the conductor is initially compressed on a first axial sub-portion of the conductor and subsequently the compression of the conductor is spread to a larger second axial sub-portion.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a method for producing high-quality cables which makes it possible to produce cables having a comparatively low production outlay. In other embodiments, the invention also comprises a novel device, for producing high-quality cables of this type, and cables produced by the method.

According to an embodiment of the invention, the method is used to produce a cable which comprises a conductor which comprises a plurality of individual wires. The conductor is enclosed by a piece of insulation at least in portions, in particular along an axial portion of the conductor. In addition, the conductor comprises a barrel. The method comprises the following steps:

heating the conductor, carrying out a crimping process for electrically contacting the barrel with the conductor, the barrel being pressed together with the heated conductor during the crimping process in such a way that the conductor is initially compressed on a first axial sub-portion of the conductor, and subsequently the compression of the conductor is spread to a larger second axial sub-portion of the conductor.

Advantageously, the crimping process is carried out immediately after the conductor is heated.

The conductor is heated in such a way that it is heated to the desired temperature in a very short time. Accordingly, it is heated using a comparatively high power.

Advantageously, the conductor is heated by an induction process.

Preferably, to carry out the crimping process, a first tool is moved relative to a second tool in a z direction and the first tool and/or the second tool is/are heated. In particular, the barrel is pressed together with the conductor using a first tool having a first crimping face and a second tool having a second crimping face. To carry out this crimping process, the first tool is moved relative to the second tool in a z direction. Furthermore, the first tool or the second tool or both tools is/are heated, the conductor being heated or temperature-controlled by way of the contact with the heated tool. In this configuration of the method too, the temporal sequence of the crimping process is set up in such a way that the conductor has reached the required processing temperature before the crimping process is complete.

The crimping faces are the faces of the tools which are brought into touch contact with the barrel or with the conductor during the crimping process. To improve the service life of the tools, the crimping faces may be treated, in particular coated, in such a way that the coefficient of friction and the static friction wear are reduced. Likewise, suitably coating the crimping faces of the tools can reduce or prevent material accumulations and cold welding during the operating time.

Advantageously, before the heating process, the piece of insulation is removed at least in portions. In particular, the piece of insulation is removed on the axial portion of the cable at which the barrel is subsequently electrically contacted with the conductor.

Advantageously, the crimping process is configured in such a way that the compression of the conductor spreads axially, starting from the first axial sub-portion, on both sides of the first axial sub-portion.

Alternatively, the conductor may also not be stripped before carrying out the crimping process such that the high temperature of the conductor in conjunction with one or more heated tools potentially axially displaces the soft or liquid material of the piece of insulation during the crimping process.

In a further embodiment of the invention, the material of the piece of insulation comprises ethylene vinyl acetate (EVA) or PEVA (polyethylene vinyl acetate).

Preferably, the conductor is configured in such a way that the individual wires thereof have a twist pitch of at least 12 mm, in particular of at least 20 mm, in particular of at least 30 mm. The term twist pitch describes the length of the path required by a single individual wire of the conductor for a 360° rotation.

Preferably, the conductor of a core comprises at least 10 individual wires, in particular at least 20 individual wires.

Advantageously, the crimping process is carried out when the temperature of the conductor is above 60° C., preferably at a temperature of above 150° C., in particular at a temperature of above 200° C. In particular, it is advantageous if the crimping process is carried out at a conductor temperature which is above the melting point of the material of the piece of insulation.

In a further embodiment of the invention, the cable comprises a plurality of conductors which each comprise a plurality of individual wires. The conductors are each enclosed by a piece of insulation at least in portions. The cable additionally comprises a plurality of barrels, the crimping process for electrically contacting the barrel being carried out when the conductor is heated, while another conductor is heated simultaneously in preparation of the crimping process for the other conductor.

In another embodiment, the invention provides a device for producing a cable having a conductor which comprises in particular a plurality of individual wires, the conductor being electrically contacted with a barrel by a crimp connection. The device comprises a heating device for heating the conductor. The device further comprises a first tool having a first crimping face and a second tool having a second crimping face. To produce the crimp connection, the first tool is movable relative to the second tool in a z direction over a processing range. In a first position of the tools relative to one another, the crimping faces are arranged opposite one another over an axial length in the z direction. In addition, in the first relative position, which is taken up in particular at the start of the pressing of the barrel by the tools, there are pairs of points, each comprising a first point on the first crimping face and a second point on the second crimping face. The two points of a pair of points are arranged opposite one another in the z direction, the distances in the z direction between the associated points of a pair of points being different for pairs of points at an axial distance from one another.

The term "axial" means in the direction of the longitudinal axis of the conductor to be crimped, in other words orthogonally to the z direction.

The conductor is usually enclosed by a piece of insulation at least in portions, in other words in an axial portion.

Advantageously, the heating device is configured as an induction heating device; in particular, the heating device comprises an electromagnetic coil.

In a further embodiment of the invention, the first tool or the second tool is heatable. Alternatively, both tools may also be heatable. In this case, the heating device may be configured as an electrical resistance heater for heating the first and/or the second tool.

Preferably, the first tool and/or the second tool comprise(s) a plurality of sub-elements, each of the sub-elements comprising a crimping face. The sub-elements of the first tool are arranged so as to be displaceable relative to one another in the z direction. Alternatively or in addition, the sub-elements of the second tool may also be arranged so as to be displaceable relative to one another in the z direction.

In particular, the device may be configured in such a way that, to produce the crimp connection, the first tool is movable relative to the second tool in the z direction within a processing range, the differences in the distances between points belonging to different axially spaced pairs of points becoming smaller as the tools increasingly approach one another. Thus, at least one sub-element of a tool temporally precedes at least one other sub-element of the same tool during the movement in the z direction.

In another embodiment, the invention provides a cable produced by the method according to the invention, which comprises a conductor which has a plurality of individual wires and is enclosed by a piece of insulation at least in portions, the cable additionally having a barrel which is electrically contacted with the conductor by a crimp connection.

Using embodiments of the invention, it is possible to produce high-quality cables. In particular, remains of the piece of insulation from the axial sub-portion of the cable which is electrically contacted with the barrel are displaced or squeezed. This results in a cable which has a largely residue-free crimp connection. An embodiment of the invention is advantageous in particular for cables having a comparatively high twist pitch and having a large number of individual wires.

Figure 1A:
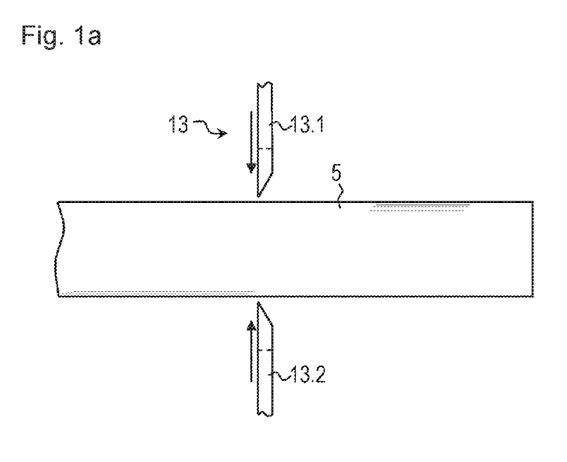
FIG. 1a is a side view of a cable along with a cutting tool at the start of the processing process.

FIG. 1*a* is a side view of an end of a cable which is to be processed or prepared. In this figure, only an outer jacket 5 of the cable can be seen, the jacket 5 being made of electrically insulating material, for example of a thermoplastic elastomer, in particular based on urethane.

In the present embodiment, the cable comprises four twisted cores 1, 2, 3, 4. The cores 1, 2, 3, 4 each comprise an internal conductor 1.1, 2.1, 3.1, 4.1 (FIG. 1*b*), each of the conductors 1.1, 2.1, 3.1, 4.1 consisting of a plurality of stranded individual wires. In the present embodiment, the twist pitch is 20 mm. Each of the cores 1, 2, 3, 4 or each conductor 1.1, 2.1, 3.1, 4.1 comprises 27 individual wires in this case.

Figure 1B:
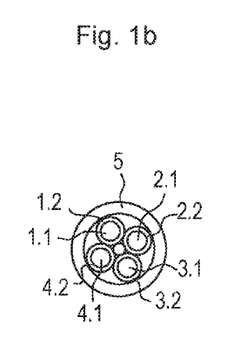
FIG. 1b is a front view of the cable.

Each conductor 1.1, 2.1, 3.1, 4.1 is enclosed by a piece of insulation 1.2, 2.2, 3.2, 4.2 in each case. In the present embodiment, the material for the pieces of insulation 1.2, 2.2, 3.2, 4.2 is ethylene vinyl acetate (EVA). The jacket 5 is located radially outside the cores 1, 2, 3, 4.

Figure 2:
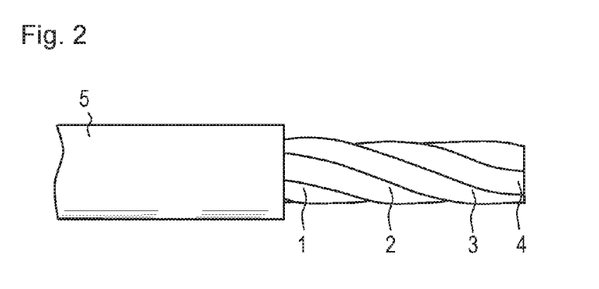
FIG. 2 is a side view of the cable at the end of which cable cores of the cable are exposed.

During preparation, the end of the cable is initially processed in a device for producing the ready-to-use cable using a cutting tool 13 (FIG. 1*a*). The cutting tool comprises two cutting blades 13.1, 13.2, which have a V shape for encompassing the jacket 5. To cut the jacket 5, the cutting blades 13.1, 13.2 are moved towards one another orthogonally to the longitudinal axis of the cable until the cutting blades 13.1, 13.2 have penetrated into the jacket 5 to a sufficient depth. Subsequently, the end of the jacket 5 is removed in the axial direction so that ultimately, in accordance with FIG. 2, the jacket 5 at one end of the cable is removed and the internal cores 1, 2, 3, 4 are exposed there.

Figure 3:
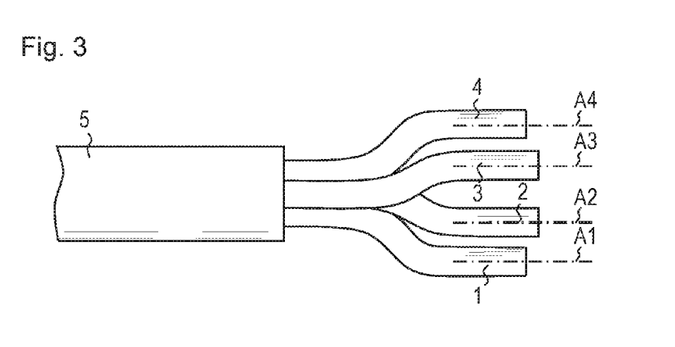
FIG. 3 is a side view of the cable after a further processing step.

In a subsequent step of producing or preparing the cable, the cores 1, 2, 3, 4 are largely extended in accordance with FIG. 3 and arranged in a fork shape such that the ends of the cores 1, 2, 3, 4 lie in one plane. The ends of the cores 1, 2, 3, 4 each have a longitudinal axis A1, A2, A3, A4, the longitudinal axes A1, A2, A3, A4 being arranged substantially mutually in parallel and accordingly in one plane.

Figure 4:
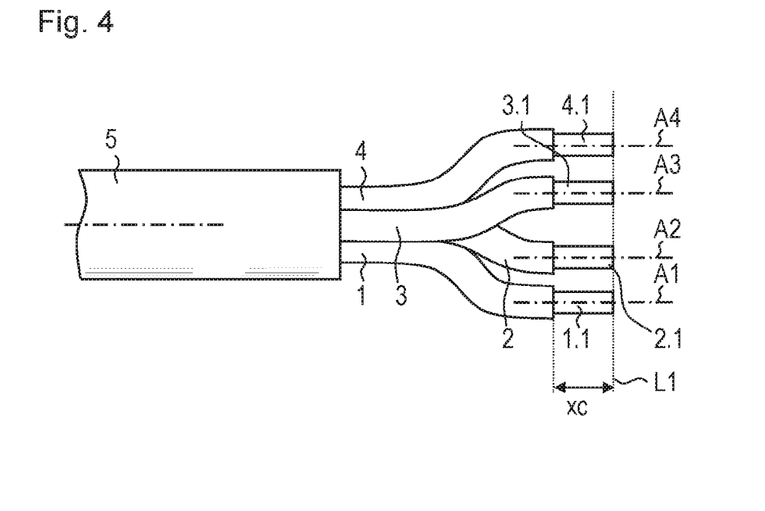
FIG. 4 is a side view of the cable after a cutting process and a stripping step.

To achieve a defined length of the cores 1, 2, 3, 4, they are initially cut to length along a line L1 in accordance with FIG. 4. Subsequently, the ends of the cores 1, 2, 3, 4 are stripped over a length xc in such a way that the conductors 1.1, 2.1, 3.1, 4.1 are exposed there. As stated previously, the conductors 1.1, 2.1, 3.1, 4.1 comprise twisted individual wires. As a result of the production, remains of the piece of insulations 1.2, 2.2, 3.2, 4.2 are also located in the stripped regions of the conductors 1.1, 2.1, 3.1, 4.1 between the twisted individual wires of the conductors 1.1, 2.1, 3.1, 4.1.

Figure 5:
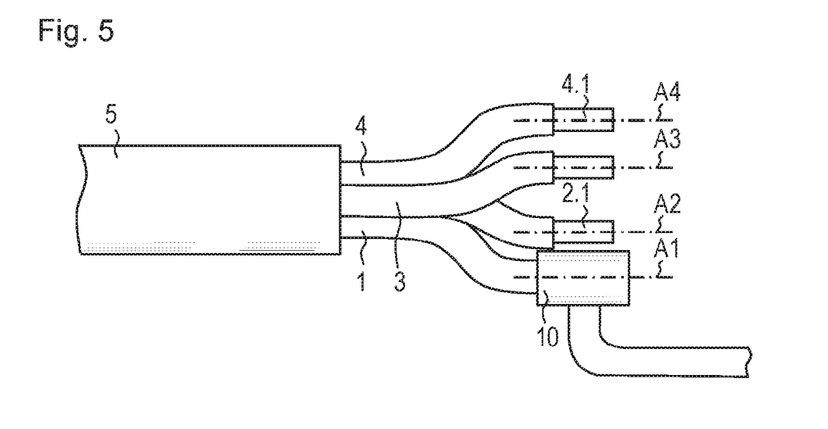
FIG. 5 is a side view of the cable along with a heating device.

In the next processing step, a heating device 10, configured substantially as a hollow cylinder, is slid over the first conductor 1.1. In this case, the heating device 10 is configured as an induction heating device, and comprises a winding through which an appropriate alternating current flows such that a heat-generating eddy current is induced in the conductor 1.1.

Figure 6A:
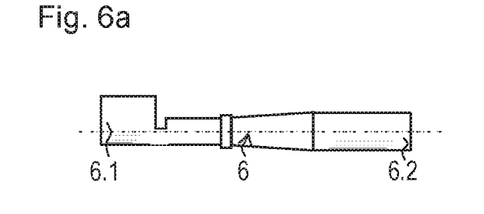
FIG. 6a is a side view of a barrel.
Figure 6B:
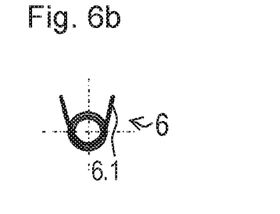
FIG. 6b is a front view of the barrel.

Immediately thereafter, a barrel 6 according to FIG. 6a, 6b is connected to the first conductor 1.1 in a crimp connection. In the present embodiment, the electrically conductive barrel 6 comprises an open crimping claw 6.1 and a coupling end 6.2 which is suitable for producing a plug-in connection to a further coupling part when the cable is used as intended.

Figure 7:
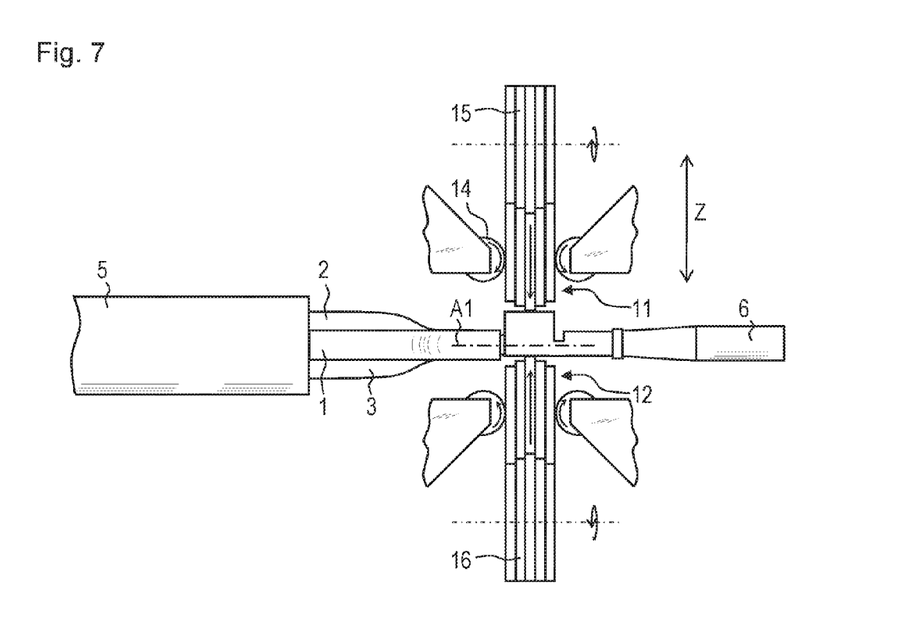
FIG. 7 is a side view of the cable, along with tools for crimping, in a first relative position.

Once the first conductor 1.1 has been heated sufficiently so as to have a temperature in the stripped region which is above the melting point of the piece of insulation 1.2, the heater 10 is removed. The first conductor 1.1 is subsequently fed to the crimping device, the stripped first conductor 1.1 being positioned in the crimping claw 6.1. The crimping claw 6.1 and the stripped first conductor 1.1 are located between a first tool 11, for example a crimp indentor, and a second tool 12, such as an anvil or a second crimp indentor, of the crimping device (FIG. 7).

To crimp the first conductor 1.1, the first tool 11 is moved relative to the second tool 12 in a z direction within a processing range.

Figure 9:
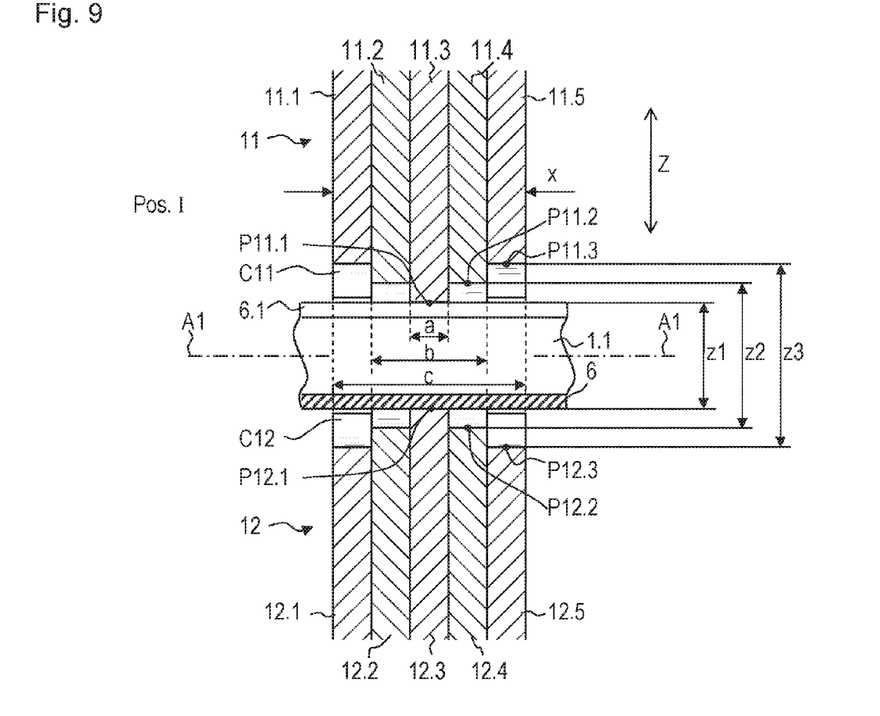
FIG. 9 is a detail in longitudinal section of the tools, along with the cable, in the first relative position.

FIG. 9 is a central longitudinal section through the first tool 11, the second tool 12, the barrel 6 and through the first conductor 1.1, the sectional view of the individual wires having been omitted in this case too for improved clarity. The first tool 11 and the second tool 12 have an axial length x and encompass the barrel 6 together with the conductor 1.1. In addition, the first tool 11 has a first crimping face C11 and the second tool 12 has a second crimping face C12.

In the first embodiment of FIG. 9, the first tool 11 and the second tool 12 each comprise a plurality of sub-elements 11.1 to 11.5, 12.1 to 12.5. The first crimping face C11 extends over the sub-elements 11.1 to 11.5 of the first tool 11 and the second crimping face C12 extends over the sub-elements 12.1 to 12.5 of the second tool 12. Thus, each of the sub-elements 11.1 to 11.5; 12.1 to 12.5 has a crimping face C11, C12.

The crimping faces C11, C12 are designed to come into mechanical contact with the barrel 6, in particular with the crimping claw 6.1, in order to deform it plastically.

The sub-elements 11.1 to 11.5 of the first tool 11 are arranged so as to be displaceable relative to one another in the z direction. Likewise, the sub-elements 12.1 to 12.5 of the second tool 12 are arranged so as to be displaceable relative to one another in the z direction. Thus, the sub-elements 11.1 to 11.5; 12.1 to 12.5 of the same tool 11, 12 are arranged so as to be displaceable relative to one another in the z direction.

FIG. 9 shows the device for producing the crimp connection in a position at the start of the crimping process, in which the tools 11, 12 are in a first position I relative to one another and in which the crimping faces C11, C12 are arranged opposite one another over an axial length x in the z direction.

In geometric terms, in the device for producing the crimp connection, there are pairs of points which each comprise a first point P11.1, P11.2, P11.3 on the first crimping face C11 and a second point P12.1, P12.2, P12.3 on the second crimping face C12.

The two points P11.1, P11.2, P11.3; P12.1, P12.2, P12.3 of a pair of points are arranged opposite one another in the z direction, in other words shown above one another in FIG. 9 (pairs of points: P11.1-P12.1/P11.2-P12.2/P11.3-P12.3). In this context, in the first relative position I, the distances z1, z2, z3 between the associated points P11.1, P11.2, P11.3; P12.1, P12.2, P12.3 are different for axially spaced apart pairs of points (relative position I: $z1 \neq z2 \neq z3$).

Figure 8:
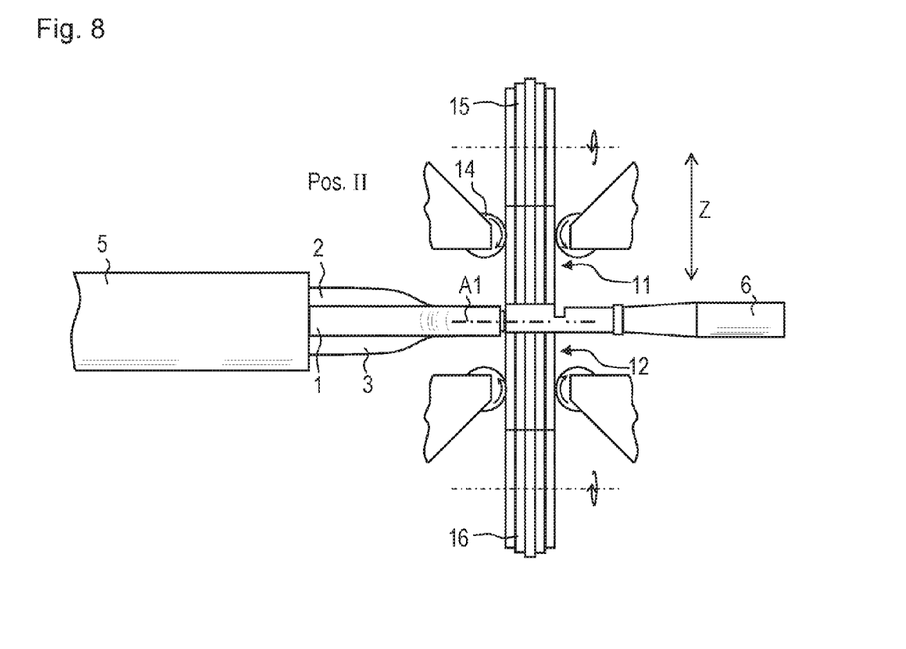
FIG. 8 is a side view of the cable, along with tools for crimping, in a second relative position.

In FIG. 9, the tools 11, 12 are shown in the first relative position I. In this relative position I, the crimping claw 6.1 is already partially plastically deformed such that compression of the first conductor 1.1 begins when the distance between the tools 11, 12 is reduced further. In the first relative position I, the distance z1, z2, z3 between the crimping faces or pairs of points P11.1-P12.1/P11.2-P12.2/P11.3-P12.3, which are opposite one another in the z direction, of the first and second tool 11, 12, are different over the axial length x. In FIGS. 7, 8 and 9, the difference between the distances z1, z2, z3 is shown disproportionately large for the sake of clarity. In reality, the differences $\Delta z21 = z2 - z1$ and $\Delta z32 = z3 - z2$ may be less than a millimeter.

If, starting from the relative position I, the tools 11, 12 are now brought closer together in the z direction, compression of the conductor 1.1 or the associated individual wires is initially brought about at a first axial sub-portion a of the conductor 1.1.

Because of the temperatures prevailing in the conductor 1.1 as a result of the heating, the remains of the piece of insulations 1.2, 2.2, 3.2, 4.2 between the twisted individual wires of the conductors 1.1, 2.1, 3.1, 4.1 are so hot that they are soft or liquid. As a result, during the crimping process, these remains are pushed outwards in the axial direction on both sides in the direction of the axis A1 with respect to the central sub-elements 11.3, 12.3, in other words outside the first axial sub-portion a into a second axial sub-portion b. As the distance between the tools 11, 12 continues to be reduced, the compression of the conductor 1.1 is subsequently spread by the sub-elements 11.2, 11.4, 12.2, 12.4 to the second axial sub-portion b, which is wider than the first axial sub-portion a. Accordingly, the remains of the piece of insulation 1.2 are displaced further axially outwards between the twisted individual wires of the conductor 1.1, in particular into the third axial sub-portion c. Finally, as the tools 11, 12 are brought closer together, the sub-elements 11.1, 11.5, 12.1, 12.5 also compress the heated individual wires in such a way that the accumulated remains of the piece of insulation 1.2 are also displaced from the third axial sub-portion c, between the twisted individual wires.

The crimping device is configured in such a way that, from a particular minimum distance between the central sub-elements 11.3, 12.3 onwards, as the tools 11, 12 are brought closer together the differences $\Delta z21=z2-z1$ and $\Delta z32=z3-z2$ become smaller, and in the final position of the tools 11, 12, in other words when the deformation of the sleeve 6 is complete, the differences $\Delta z21$ and $\Delta z32$ assume a value of zero (relative position II of FIG. 8).

For this purpose, the device for producing a cable has two shafts 15, 16 formed in the manner of a camshaft. Each of the shafts 15, 16 rotates about its own axis, cams or eccentric paths in each case converting these rotational movements into a longitudinal movement of the sub-elements 11.1 to 11.5 and sub-elements 12.1 to 12.5 which are displaceable relative to one another in the z direction. At the end of the processing range according to FIG. 8, in other words in the second relative position II, the sub-elements 11.1 to 11.5, 12.1 to 12.5 have taken up a position relative to one another in which the crimping faces C11, 12 do not have any steps. In order for the comparatively thin sub-elements 11.1 to 11.5, 12.1 to 12.5 not to be deformed or pushed apart during the crimping process, the crimping device comprises guide rollers 14, which axially hold the packets of sub-elements 11.1 to 11.5, 12.1 to 12.5 together (in the direction of the longitudinal axis of the conductor to be crimped).

While the first conductor 1.1 and the barrel 6 are being crimped, the second conductor 1.2 is already being heated by the heating device. Once the first crimping process is complete, the second crimping process can subsequently be carried out immediately, while the third conductor 1.3 is already being heated up. In this manner, all of the conductors 1.1 to 4.1 can be processed (heated and crimped) in succession. Alternatively, of course, parallel processing may also be carried out using a correspondingly configured device such that all of the conductors 1.1 to 4.1 are heated simultaneously and are simultaneously crimped immediately thereafter.

A heating device may be provided for one of the tools 11, 12 or for both tools such that the tools 11, 12 are heated during the crimping process. Equally, the barrel 6 may be heated by a corresponding heating device during the crimping process.

Figure 10:
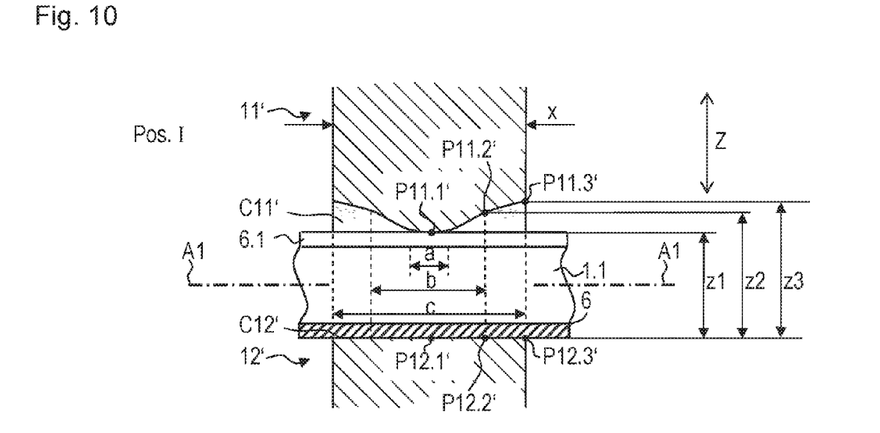
FIG. 10 is a detail in longitudinal section of the tools, along with the cable, in the first relative position in accordance with a second embodiment.

FIG. 10 shows a second embodiment, which basically differs from the first embodiment by way of a different configuration of the crimping device. Accordingly, the device comprises a first tool 11', configured in a single piece, for example as a single-piece crimp indentor. The second tool 12' is equally configured in one piece, and in this case serves as an anvil. The first tool 11' has a wavelike crimping face C11', while the second tool 12' has a crimping face C12' having a substantially hollow cylindrical shape such that, in a first relative position I according to FIG. 10, the distances z1, z2, z3 between points P11.1', P11.2', P11.3'; P12.1', P12.2', P12.3', which are opposite one another in the z direction, on the crimping faces C11', C12' of the first and second tool 11', 12' are different over the axial length x. Accordingly, in this case too there are pairs of points which each comprise a first point P11.1', P11.2', P11.3' on the first crimping face C11' and a second point P12.1', P12.2', P12.3' on the second crimping face C12', the two points P11.1', P11.2', P11.3'; P12.1', P12.2', P12.3' of a pair of points being arranged opposite one another in the z direction. For axially spaced apart pairs of points, the distances z1, z2, z3 between the associated points P11.1', P11.2', P11.3'; P12.1', P12.2', P12.3' are different.

In the second embodiment, after one of the conductors 1.1, 2.1, 3.1, 4.1 has been heated, a crimping process is carried out, in which the heated conductor 1.1, 2.1, 3.1, 4.1 is electrically contacted with the barrel 6. Pressing is carried out in such a way that the conductor 1.1, 2.1, 3.1, 4.1 is initially compressed on the first axial sub-portion a of the conductor 1.1, 2.1, 3.1, 4.1. Subsequently, the compression of the conductor 1.1, 2.1, 3.1, 4.1 is spread to a larger, second axial sub-portion b and finally to the even larger axial sub-portion c. It is thus provided that, during the crimping process, remains of the piece of insulation 1.2, 2.2, 3.2, 4.2 are displaced outwards in the axial direction on both sides in the direction of the axis A1, in other words outside the axial sub-portion c.

A heating device may be provided for one of the tools 11', 12' or for both tools such that the tools 11', 12' are heated during the crimping process. Equally, the barrel 6 may be heated by a corresponding heating device during the crimping process.

Figure 11:
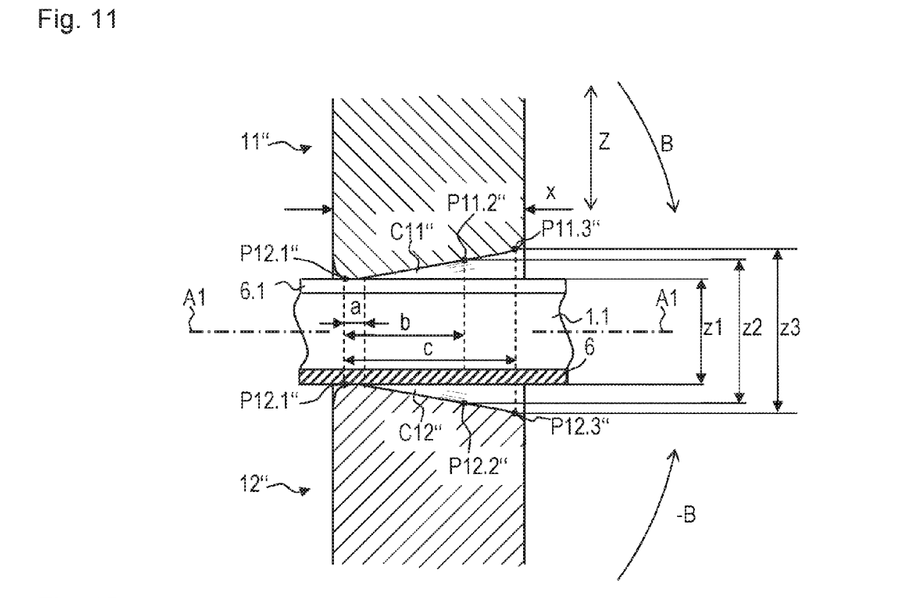
FIG. 11 is a detail in longitudinal section of the tools, along with the cable, in the first relative position in accordance with a third embodiment.
Figure 12:
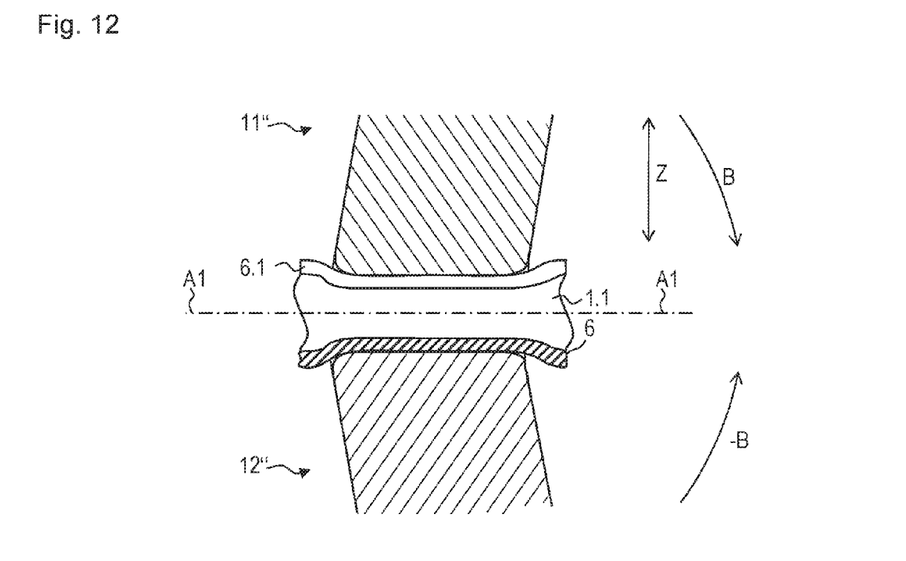
FIG. 12 is a detail in longitudinal section of the tools, along with the cable, in the second relative position in accordance with the third embodiment.

FIGS. 11 and 12 show a variant according to a third embodiment. The third embodiment basically differs from the first and second embodiment by way of a different configuration of the crimping device. Accordingly, the device comprises a first tool 11" and a second tool 12" which are each configured in a single piece, for example as a single-piece crimp indentor. The tools 11", 12" each comprise an oblique or conical crimping face C11", C12". As a result, in a first relative position I according to FIG. 11, the distances z1, z2, z3 between points P11.1", P11.2", P11.3"; P12.1", P12.2", P12.3", which are opposite one another in the z direction, on the crimping faces C11", C12" of the first and the second tool 11", 12" are different over the axial length x. Accordingly, in this case too there are pairs of points which each comprise a first point P11.1", P11.2", P11.3" on the first crimping face C11" and a second point P12.1", P12.2", P12.3" on the second crimping face C12', the two points P11.1", P11.2", P11.3"; P12.1", P12.2", P12.3" of a pair of points being arranged opposite one another in the z direction. For pairs of points which are axially spaced apart, the distances z1, z2, z3 between the associated points P11.1", P11.2", P11.3"; P12.1", P12.2", P12.3" are different.

In the third embodiment too, after one of the conductors 1.1, 2.1, 3.1, 4.1 is heated, a crimping process is carried out, in which the heated conductor 1.1, 2.1, 3.1, 4.1 is electrically contacted with the barrel 6.

In the third embodiment, the tools 11", 12" are not merely moved relative to one another in the z direction but are also pivoted during the crimping process in the direction of the arrows B, −B about an axis oriented perpendicularly to the z direction and also perpendicularly to the axis A1.

The pressing now takes place in this case in such a way that the conductor 1.1, 2.1, 3.1, 4.1 is initially compressed on the first axial sub-portion a of the conductor 1.1, 2.1, 3.1, 4.1. Subsequently, as a result of the movement in the z direction and the superposed pivoting movement, the compression of the conductor 1.1, 2.1, 3.1, 4.1 is spread to a larger, second axial sub-portion b and finally to the even larger axial sub-portion c. It is thus provided here too that, during the crimping process, remains of the piece of insulation 1.2, 2.2, 3.2, 4.2 are displaced outwards in the axial direction, i.e. in the direction of the axis A1, outside the axial sub-portion c.

A heating device may be provided for one of the tools 11", 12" or for both tools such that the tools 11", 12" are heated during the crimping process. Equally, the barrel 6 may be heated by a corresponding heating device during the crimping process.

FIG. 12 shows a relative position II of the tools 11", 12" at the end of the processing range, in which the tools 11", 12" have been brought together in the z direction and pivoted in the direction of the arrows B, −B.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for producing a cable which comprises a conductor and a barrel, the conductor having individual wires and being enclosed, at least in portions, by a piece of insulation, the method comprising:
   heating the conductor using an induction process; and
   carrying out a crimping process for electrically contacting the barrel with the conductor wherein the conductor comprises an axial extension in a direction of its longitudinal axis, and wherein the barrel is pressed together with the heated conductor during the crimping process in such a way that the conductor is initially compressed on a first axial sub-portion of the conductor and subsequently the compression of the conductor is spread to a larger second axial sub-portion, wherein the crimping process is carried out directly after the heating of the conductor at a conductor temperature above a melting point of the insulation.

2. The method according to claim 1, wherein, to carry out the crimping process, a first tool is moved relative to a second tool in a z direction, and wherein at least one of the first tool and the second tool are heated.

3. The method according to claim 1, wherein, before the heating of the conductor, the piece of insulation is removed at least in portions.

4. The method according to claim 1, wherein the compression of the conductor spreads, starting from the first axial sub-portion, on both sides of the first axial sub-portion.

5. The method according to claim 1, wherein the material of the piece of insulation comprises ethylene vinyl acetate.

6. The method according to claim 1, wherein the conductor is configured in such a way that the individual wires thereof have a twist pitch of at least 12 mm.

7. The method according to claim 1, wherein the crimping process is carried out when the temperature of the conductor is above 60° C.

8. A device for producing a cable, the cable having a conductor which comprises a plurality of individual wires being enclosed, at least in portions, by a piece of insulation, the conductor being electrically contacted with a barrel by a crimp connection, being enclosed, at least in portions, by a piece of insulation, the device comprising:
   an induction heater configured to heat the conductor;
   a first tool having a first crimping face; and
   a second tool having a second crimping face, wherein the first tool is movable relative to the second tool in a z direction, and, in a first position of the tools relative to one another;
   the crimping faces are arranged opposite one another with respect to the z direction and extend in an axial direction along a longitudinal axis of the conductor, and
   there are pairs of points at an axial distance from one another, each comprising a first point on the first crimping face and a second point on the second crimping face, wherein the two points of the pairs of points are arranged in each case opposite one another in the z direction, wherein distances between the two points of the pairs of points in the z direction are different for the pairs of points at the axial distance from one another, wherein the device is configured to produce the crimp connection directly after heating of the conductor at a conductor temperature above a melting point of the insulation.

9. The device according to claim 8, wherein at least one of the first tool and the second tool are heatable.

10. The device according to claim 8, wherein at least one of the first tool and the second tool comprises a plurality of sub-elements, wherein each of the sub-elements comprises a crimping face and the sub-elements are arranged so as to be displaceable relative to one another in the z direction.

11. The device according to claim 10, wherein, to produce the crimp connection, the first tool is movable relative to the second tool in the z direction within a processing range, wherein differences in the distances between the associated points become smaller as the tools increasingly approach one another.

12. A device for producing a cable, the cable having a conductor which comprises a plurality of individual wires being enclosed, at least in portions, by a piece of insulation, the conductor being electrically contacted with a barrel by a crimp connection, the device comprising:
   a heater configured to heat the conductor;
   a first tool having a first crimping face; and
   a second tool having a second crimping face, wherein
   the first tool is movable relative to the second tool in a z direction, and, in a first position of the tools relative to one another;
   the crimping faces are arranged opposite one another with respect to the z direction and extend in an axial direction along a longitudinal axis of the conductor, and
   there are pairs of points at an axial distance from one another, each comprising a first point on the first crimping face and a second point on the second crimping face, wherein the two points of the pairs of points are arranged in each case opposite one another in the z direction, wherein distances between the two points of the pairs of points in the z direction are different for the pairs of points at the axial distance from one another, and wherein at least one of the first tool and the second tool comprises a plurality of sub-elements, wherein each of the sub-elements comprises a crimping face and the sub-elements are arranged so as to be displaceable relative to one another in the z direction, wherein the device is configured to produce the crimp connection directly after heating of the conductor at a conductor temperature above a melting point of the insulation.

13. The device according to claim 12, wherein the heater is an induction heating device.

14. The device according to claim 12, wherein at least one of the first tool and the second tool are heatable.

15. The device according to claim 12, wherein, to produce the crimp connection, the first tool is movable relative to the second tool in the z direction within a processing range, wherein differences in the distances between the associated points become smaller as the tools increasingly approach one another.

16. A method for producing a cable which comprises a conductor and a barrel, the conductor having individual wires and being enclosed, at least in portions, by a piece of insulation, the method comprising:

heating the conductor using an induction process; and carrying out a crimping process for electrically contacting the barrel with the conductor, directly after the heating of the conductor, wherein the barrel is pressed together with the heated conductor during the crimping process in such a way that the conductor is initially compressed on a first axial sub-portion of the conductor and subsequently the compression of the conductor is spread to a larger second axial sub-portion, wherein the cable comprises a plurality of conductors which each consist of individual wires and are each enclosed, at least in portions, by a piece of insulation, and wherein the cable has a plurality of barrels, the crimping process for electrically contacting the barrel being carried out when the conductor is heated, while another conductor is heated simultaneously.

* * * * *